Inventor
Alfred Woodward Kent
by Albert & Jacobs
Attorney

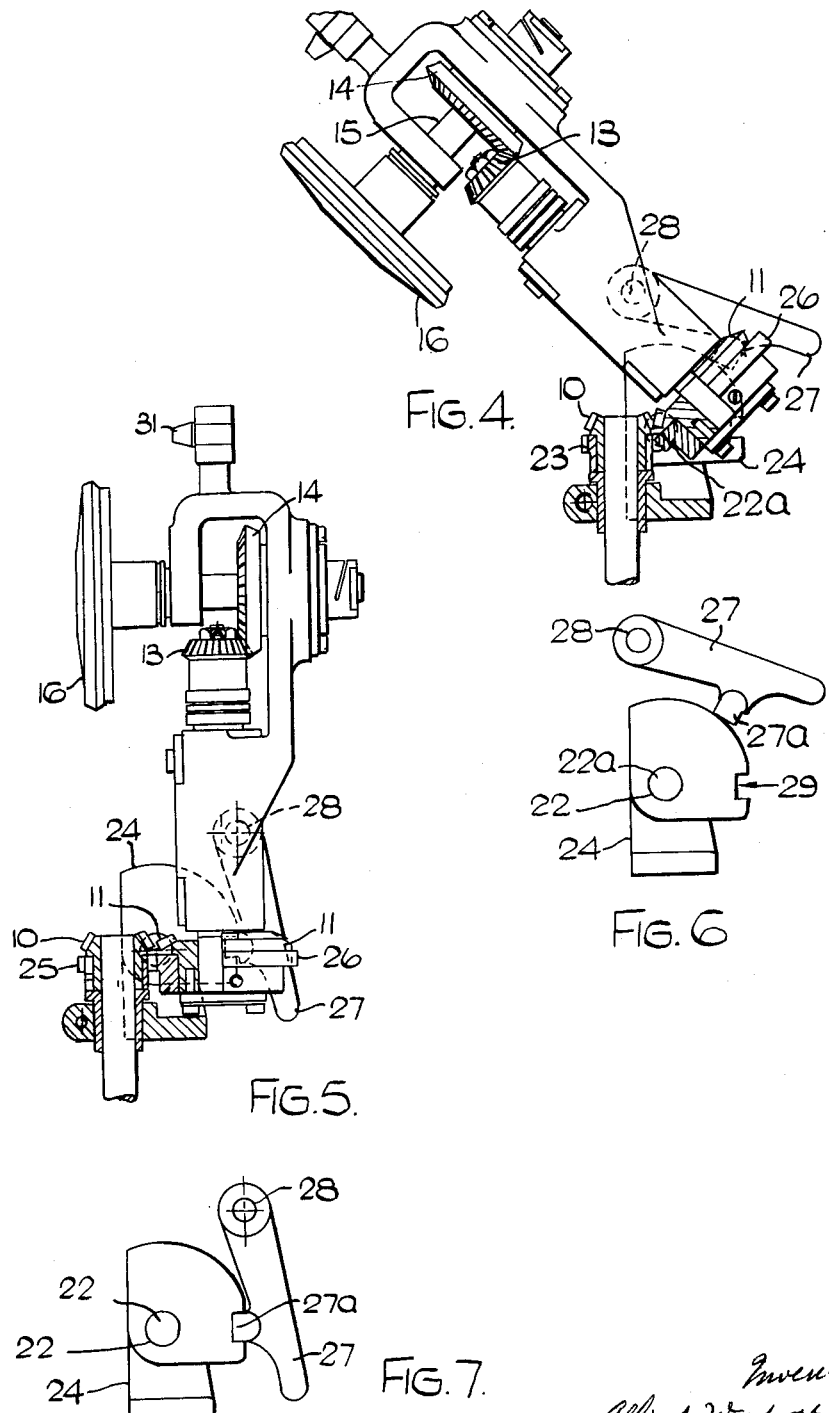

United States Patent Office 3,230,743
Patented Jan. 25, 1966

3,230,743
CIRCULAR KNITTING MACHINES
Alfred Woodward Kent, Rothley, England, assignor to Bentley Engineering Company Limited, Leicester, England
Filed Sept. 10, 1963, Ser. No. 307,959
Claims priority, application Great Britain, Sept. 12, 1962, 34,774/62
2 Claims. (Cl. 66—28)

This invention concerns circular knitting machines of the type having a rotatable needle bed, means for operating the needles in said bed, a rotatable instrument bed for instruments adapted to co-operate with the needles, means for operating instruments in the instrument bed, driving mechanism for driving the needle bed and instrument bed in synchronism, and mounting means for the instrument bed permitting bodily displacement of the latter relative to the needle bed between operative and inoperative positions. Specifically, the needle bed may be a needle cylinder and the instrument bed may be another cylinder for needles or other instruments, or a dial or other instruments such for example as welting instruments for making inturned welts on stockings or the like. The invention is particularly concerned with circular knitting machines of the type specified above wherein the needle bed is a cylinder and the instrument bed is a dial coaxial therewith. Such machines are commonly known as cylinder and dial machines and are hereinafter referred to as such.

In a cylinder and dial machine the instruments carried by the dial must be located with extreme accuracy with regard to the needles. For example they must be aligned with the needles. Moreover, in fine gauge, inturned welt machines extreme accuracy is necessary both as regards concentricity of the dial with the cylinder and alignment of its instruments with the needles. The dial is rotatably driven by shafts and gearing, either from the needle cylinder or from the main shaft of the machine. In order to observe the knitting action and the fabric just made, and to obtain access to any of the components within the cylinder, it is necessary to be able to raise the dial clear of the cylinder. This is also of advantage when changing needles and sinkers, and it is necessary to give access to the dial instruments. For this purpose the dial is usually carried in bearings on the latch ring and the latter is hinged in such manner that it can be swung upwards for the purpose mentioned. A difficulty that has hitherto been encountered is that when the dial is swung up to its inoperative position two of the driving gears are separated. The dial must be returned to the same relationship with the cylinder before the machine is allowed to resume operation, but since for mechanical convenience the driving member from or through which the dial is driven may revolve at four times the cylinder speed (a corresponding reduction taking place at a later stage in the dial drive) it is easy to replace the dial in the wrong position even though the gears are marked because the gears may be rotated through for example one, two or three revolutions while the dial is in its inoperative position and the machine is being turned by hand so that upon the dial being replaced the markings on the teeth of the gear can coincide although the dial is wrongly located in relation to the cylinder. An object of the present invention is to provide in a circular knitting machine of the type specified an arrangement permitting the instrument bed to be moved between operative and inoperative positions without disturbing its register with the needle bed.

The invention therefore provides a circular knitting machine of a type specified in which the drive for the instrument bed comprises gearing whereof components are relatively movable in said displacement of the instrument bed while maintaining the driving connection between and the rotational relation between needle bed and instrument bed.

In one construction this gearing comprises main driving and driven gears which mesh to a decreasing extent in displacement to inoperative position and supplementary driving and driven gears which mesh to an increasing extent in said displacement.

In an alternative construction the gearing comprises driving and driven gears which remain in mesh during said displacement.

Preferably the instrument bed is pivotally displaceable and it is further preferred that the axis of pivotal displacement should extend at right angles to the axis of the instrument bed.

In order that the invention may be better understood reference will now be made to the accompanying drawings, in which:

FIGURE 4 shows the dial partly raised towards its inoperative position.

FIGURE 5 shows the dial fully raised to inoperative position.

FIGURES 6 and 7 show a catch mechanism for holding the dial in its inoperative position, the position of the parts shown in FIG. 6 corresponding to that shown in FIG. 4 and the position shown in FIG. 7 corresponding to that shown in FIG. 5.

Figure 1:
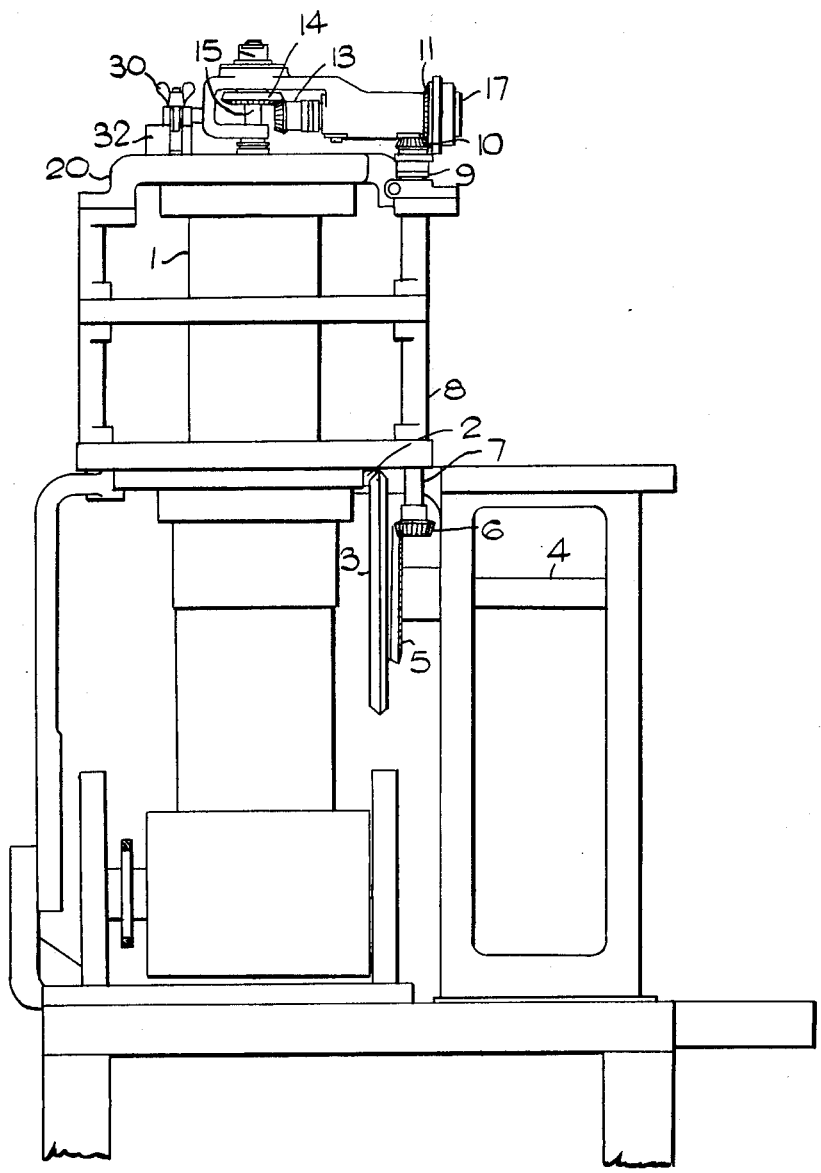
FIGURE 1 is a view showing the relevant parts of a knitting machine according to this invention.

The machine shown in the drawings is a cylinder and dial machine of the type specified; sufficient of the machine is shown to permit it to be identified. It has a rotatable needle cylinder 1 which carries independent needles 19 (operable by conventional cams) and is driven by equal bevel gears 2, 3 from the main shaft 4. On the rear of bevel wheel 3 there is fixed a smaller bevel wheel 5 which drives a bevel pinion 6 on the lower end of a vertical shaft 7 supported in bearings 8 and 9. Conveniently, shaft 7 is driven at four times the cylinder speed. At its upper end it carries a bevel wheel 10, meshing with bevel wheel 11 on a normally horizontal intermediate shaft 12 carried in a bracket or arm 23. The gearing 10, 11 is conveniently such that shaft 12 revolves at half the speed of shaft 7 and therefore at twice the speed of cylinder 1.

The arm or bracket 23 also carries the vertical dial spindle 15 which is coaxial with the needle cylinder 1. The spindle 15 supports at its lower end a dial unit consisting of a dial 16 cut with radial tricks to accommodate welting instruments 18 and a dial cam plate 21 which is non-rotatable and carries conventional cams for operating instruments 18. The manner in which the needles 19 and welting instruments 18 co-operate in producing an inturned welt on a seamless stocking or the like is well understood in the art. The horizontal shaft 12 carries at its inner end a bevel gear 13 which meshes with a bevel gear 14 on the spindle 15 and the relationship of these gears is such that spindle 15 is driven at half the speed of shaft 12 and the speed of rotation of the dial 16 is the same as that of the cylinder 1. The latch ring is indicated at 20. Any suitable mechanism may be provided at region 17 so that shaft 12 can be rotatably adjusted in relation to gear 11 to adjust the dial 16 and its instruments 18 circumferentially relatively to the needles 19.

Figure 2:
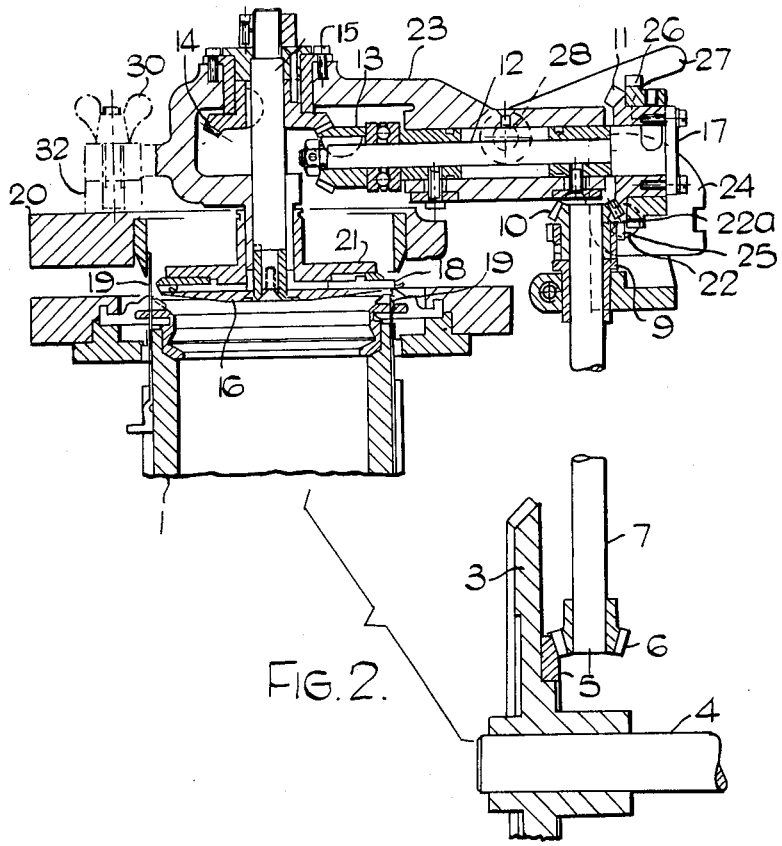
FIGURE 2 is a sectional view of the upper part of the needle cylinder and the dial with the driving mechanism therefor.
Figure 3:
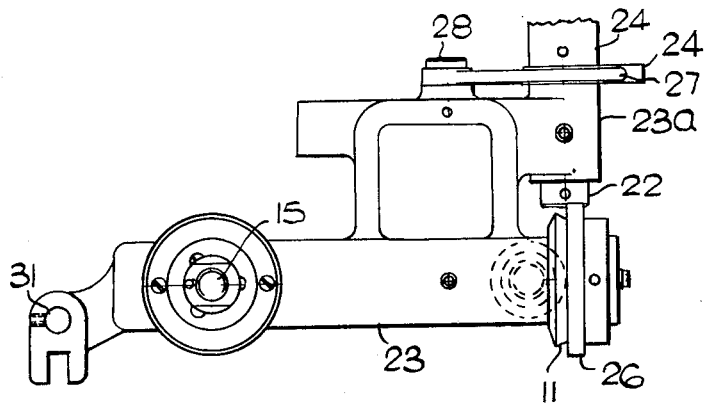
FIGURE 3 is a plan view of the arm which carries the dial.

The dial unit is bodily displaceable from the operative position shown in FIG. 2 to the inoperative position shown in FIG. 5 about an axis 22a which extends at right angles to the axis of cylinder and dial and is tangential to a circle concentric with the needle circle.

In the construction illustrated the latch ring 20 remains in position when the dial unit is swung to its inoperative position. This is especially advantageous in multi-feeder machines wherein a large number of yarns are in use for there is less danger of these yarns becoming entangled with one another if the latch ring is not raised. However, the invention is not restricted in this respect as the latch ring may move with the dial unit.

The arm 23 carrying the dial unit has a lateral extension 23a pivoted on a horizontal shaft 22 fixed in a bracket 24 secured to a part of the machine frame.

The extended horizontal axis of shaft 22 lies close to the outer diameters of the bevel wheels 10, 11 at the region where they mesh (see FIG. 2). It therefore follows that in movement of the dial unit from the operative position shown in FIG. 2 to the inoperative position shown in FIG. 5 the extent to which these bevel wheels mesh gradually decreases. They may still remain in mesh to some extent even in the inoperative position but as shown in FIG. 5 in the illustrated construction they are out of mesh in the inoperative position of the dial unit. Therefore attached respectively to the bevel gears 10, 11 there are spur gears 25, 26 having the same ratio. These spur gears do not mesh with one another in the operative position of the dial unit but as the latter is moved towards its inoperative position they enter into mesh with one another before the bevel wheels 10, 11 pass out of mesh.

Thus when the dial unit is in the inoperative position the driving connection to it is fully maintained and said unit may be moved to and from the inoperative position without in any way disturbing the relationship between the instruments 18 and the needles 19. It is an advantage that this effect is achieved without the introduction of any driving mechanism which would be prone to develop back-lash.

In order to retain the dial unit in its inoperative position there is a locking catch 27 pivoted at 28 on the arm 23 and having a nose 27a which in movement towards the inoperative position travels over the surface of a fixed bracket 24 and eventually drops into a retaining recess 29 therein. When the dial unit is to be moved to its operative position the locking catch is disengaged manually.

The dial unit is positively located in its operative position by a tapered pin 31 on the arm 23 which enters the corresponding hole in a block 32. The arm is then locked by means of a nut 30.

If desired the spur gears 25, 26 may be integral with the respective bevel gears 10, 11, the form of the teeth changing from bevel to spur at the appropriate region. If it is desired that the dial unit shall swing through an angle other than 90° between operative and inoperative positions, appropriate bevel gears can be used in place of the spur gears 25, 26 said bevel gears being arranged to engage correctly when the dial unit is in the inoperative position.

What I claim is:

1. In a circular knitting machine the combination comprising a rotatable needle cylinder, an instrument carrying dial rotatable with the cylinder, a dial spindle on which said dial is secured, a carrier rotatably supporting said dial spindle, an intermediate shaft extending radially of the dial spindle, gearing coupling said intermediate shaft to the dial spindle, a driving shaft for driving said intermediate shaft to rotate the dial in step with the needle cylinder, intermeshing bevel gears secured to said driving spindle and said intermediate shaft respectively, means for pivoting said carrier to turn about a horizontal axis positioned close to but slightly offset from the position of intermeshing engagement between said bevel gears, whereby the carrier is pivotally raised to raise the dial away from the needle cylinder and in so doing reduce the extent of intermeshing engagement between the bevel gears to a position of non-engagement between them, and spur gears fixed respectively to said driving shaft and said intermediate shaft and having the same driving ratio as said bevel gears in positions on such shafts such that on raising said carrier the spur gears are brought into mesh with one another before the bevel gears move out of mesh.

2. In a circular knitting machine, the combination comprising a rotatable needle cylinder, means for mounting said cylinder for rotation, means for driving said cylinder, a rotatable instrument carrying dial, a carrier rotatably supporting said dial to rotate co-axially with and above said cylinder, a pivotal mounting for said carrier at a position disposed outwardly from said dial to permit the carrier to be swung upwardly to move the dial to a raised inoperative position away from the cylinder, an upstanding spindle driven by said cylinder driving means to drive the dial in step with the cylinder, an intermediate shaft extending from the dial to near the pivotal axis of the carrier and having gearing coupling it to the dial, intermeshing bevel gears secured to said intermediate shaft and said upstanding driving shaft and positioned with their intermeshing teeth close to the axis of pivoting of the carrier but with said axis slightly offset from the intermeshing teeth so that on raising the carrier the intermeshing engagement between the bevel gears progressively reduced up to a position of disengagement, and spur gears secured respectively to said intermediate shaft and said upstanding shaft for interengagement to a progressively increasing extent as the carrier is raised, said spur gears having the same ratio as said bevel gears.

References Cited by the Examiner
UNITED STATES PATENTS
1,372,345   3/1921   Franck _____ 66—28

DONALD W. PARKER, *Primary Examiner.*

RUSSELL C. MADER, *Examiner.*

P. C. FAW, *Assistant Examiner.*